(12) United States Patent
Lineback et al.

(10) Patent No.: US 9,619,735 B1
(45) Date of Patent: *Apr. 11, 2017

(54) PURE CONVOLUTIONAL NEURAL NETWORK LOCALIZATION

(71) Applicant: International Business Machines Corporation, Armonk, NY (US)

(72) Inventors: Nicholas A. Lineback, Alameda, CA (US); Michael S. Ranzinger, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,328

(22) Filed: Jun. 8, 2016

Related U.S. Application Data

(63) Continuation of application No. 15/009,026, filed on Jan. 28, 2016.

(51) Int. Cl.
*G06K 9/00* (2006.01)
*G06K 9/62* (2006.01)
*G06T 7/00* (2017.01)
*G06N 3/08* (2006.01)

(52) U.S. Cl.
CPC .......... *G06K 9/6269* (2013.01); *G06K 9/6202* (2013.01); *G06N 3/08* (2013.01); *G06T 7/0081* (2013.01); *G06T 2207/20081* (2013.01); *G06T 2207/30204* (2013.01)

(58) Field of Classification Search
CPC combination set(s) only.
See application file for complete search history.

(56) References Cited

U.S. PATENT DOCUMENTS

| | | | |
|---|---|---|---|
| 6,621,941 B1 | 9/2003 | Syeda-Mahmood et al. | |
| 7,136,507 B2 | 11/2006 | Han et al. | |
| 7,308,134 B2 | 12/2007 | Wersing et al. | |
| 2003/0174881 A1* | 9/2003 | Simard | G06K 9/00422 382/159 |
| 2005/0105765 A1 | 5/2005 | Han | |
| 2009/0134968 A1 | 5/2009 | Girgensohn et al. | |
| 2013/0279802 A1 | 10/2013 | van der Merwe | |
| 2014/0185891 A1 | 7/2014 | Schoenmeyer et al. | |

OTHER PUBLICATIONS

Jung et al., "Text Information Extraction in Images and Video: A Survey," Pattern Recognition, vol. 37, Issue 5, May 2004, 35 pages.
Lineback et al., "Pure Convolutional Neural Network Localization," U.S. Appl. No. 15/009,026, filed Jan. 28, 2016, 31 pages.
"List of IBM Patents or Patent Applications Treated as Related," Letter from Leslie A. Van Leeuwen, Jun. 8, 2016, 1 page.

* cited by examiner

*Primary Examiner* — Alex Liew
(74) *Attorney, Agent, or Firm* — VanLeeuwen & VanLeeuwen; William J. Stock

(57) ABSTRACT

An approach is provided in which a knowledge manager processes an image using a convolutional neural network. The knowledge manager generates a pixel-level heat map of the image that includes multiple decision points corresponding to multiple pixels of the image. The knowledge manager analyzes the pixel-level heat map and detects sets of decision points that correspond to target objects. In turn, the knowledge manager marks regions of the heat map corresponding to the detected sets of per-pixel decision points, each of the regions indicating a location of the target objects.

20 Claims, 6 Drawing Sheets

PURE CONVOLUTIONAL NEURAL NETWORK LOCALIZATION

BACKGROUND

The present disclosure relates to using a pure convolutional neural network to generate a heat map of an image that identifies location regions of objects within the image.

Deep learning is a branch of machine learning based on a set of algorithms that attempt to model high-level abstractions in data by using multiple processing layers with complex structures. Various deep learning architectures are used in fields such as computer vision, automatic speech recognition, natural language processing, audio recognition, and bioinformatics.

Pattern recognition systems may employ classifiers that utilize deep learning architectures to generate decisions for a set of input data. The classifiers may utilize algorithms that are structured in the form of a deep learning architecture, such as a convolutional neural network, which includes various combinations of layers to arrive at a decision. Depending on the application context, the input data may be a piece of text, an image, a sound sequence, a set of numbers, or any other representation of a piece of information, an object, an action, or an event.

Traditional convolutional neural networks typically have a set of fully connected layers that combine information from across an image to detect an object in an image. Although these traditional convolutional neural networks are useful in detecting a general object location, the traditional convolutional neural networks sacrifice resolution accuracy and the ability to identify multiple objects within an image due to their convolutional and combinatory nature.

BRIEF SUMMARY

According to one embodiment of the present disclosure, an approach is provided in which a knowledge manager processes an image using a convolutional neural network. The knowledge manager generates a pixel-level heat map of the image that includes multiple decision points corresponding to multiple pixels of the image. The knowledge manager analyzes the pixel-level heat map and detects sets of decision points that correspond to target objects. In turn, the knowledge manager marks regions of the heat map corresponding to the detected sets of per-pixel decision points, each of the regions indicating a location of the target objects.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
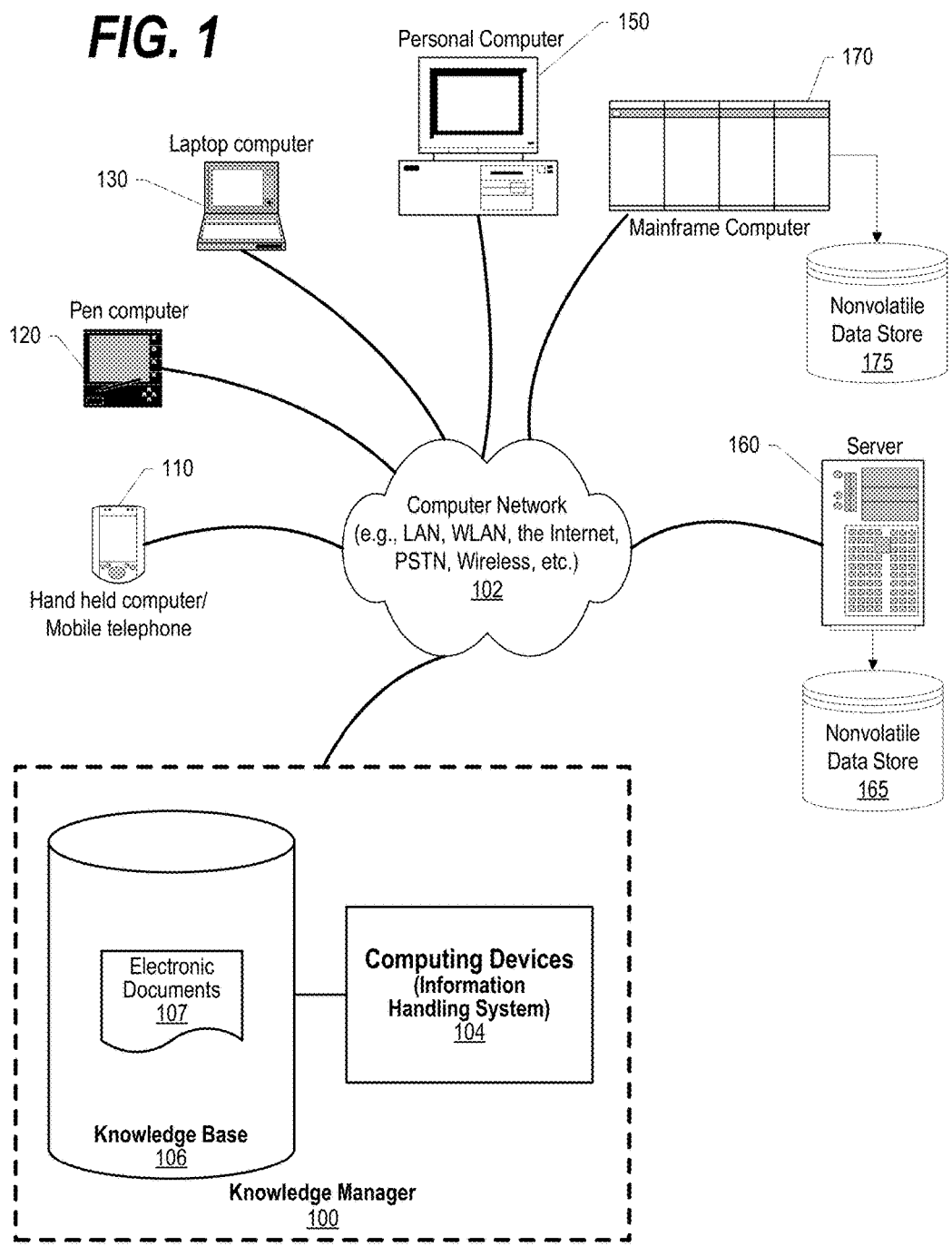
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) knowledge manager 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
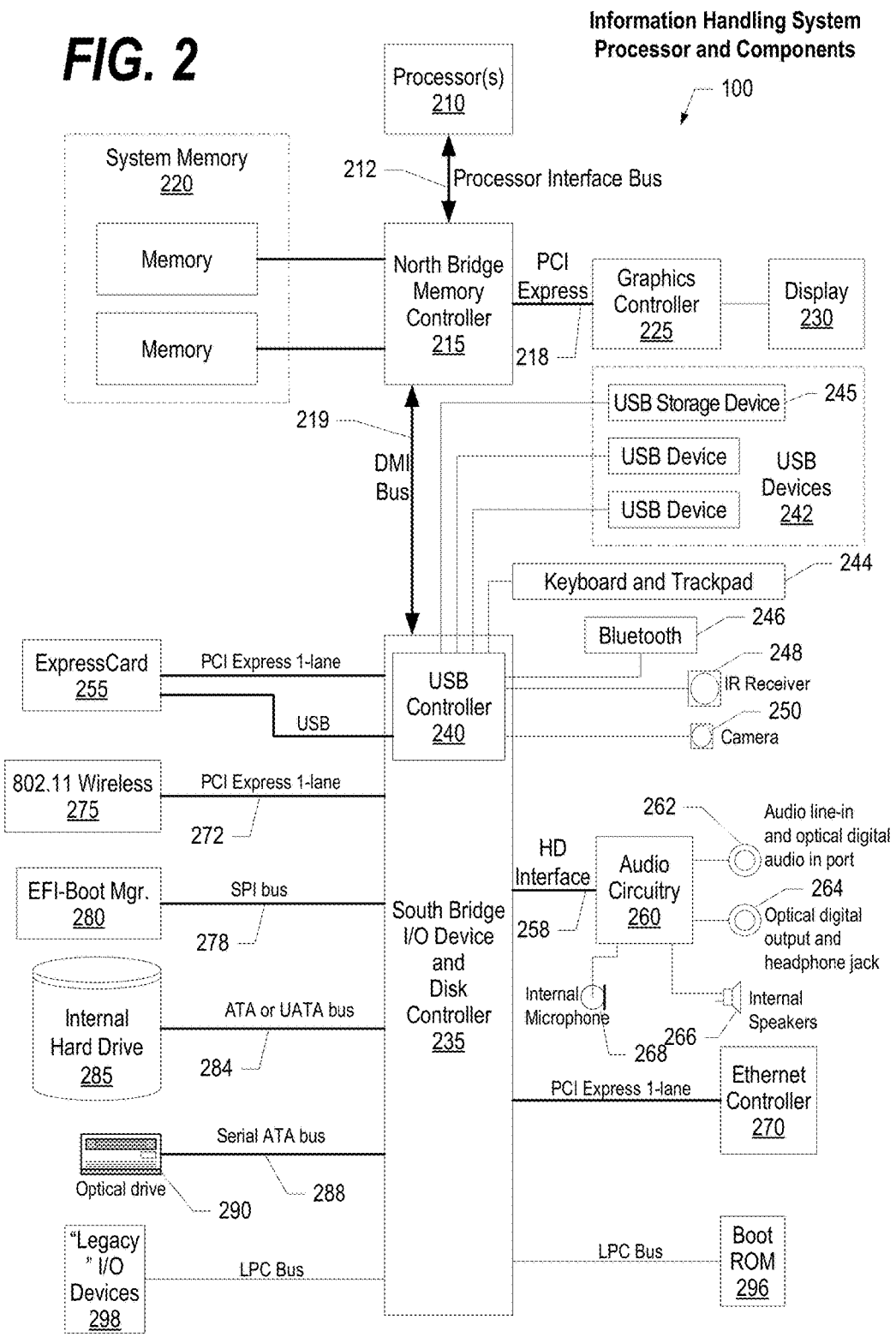
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 6 depict an approach directed towards training a convolutional neural network to generate a heat map of an image and using the heat map to detect various location regions of objects within the image.

Figure 3:
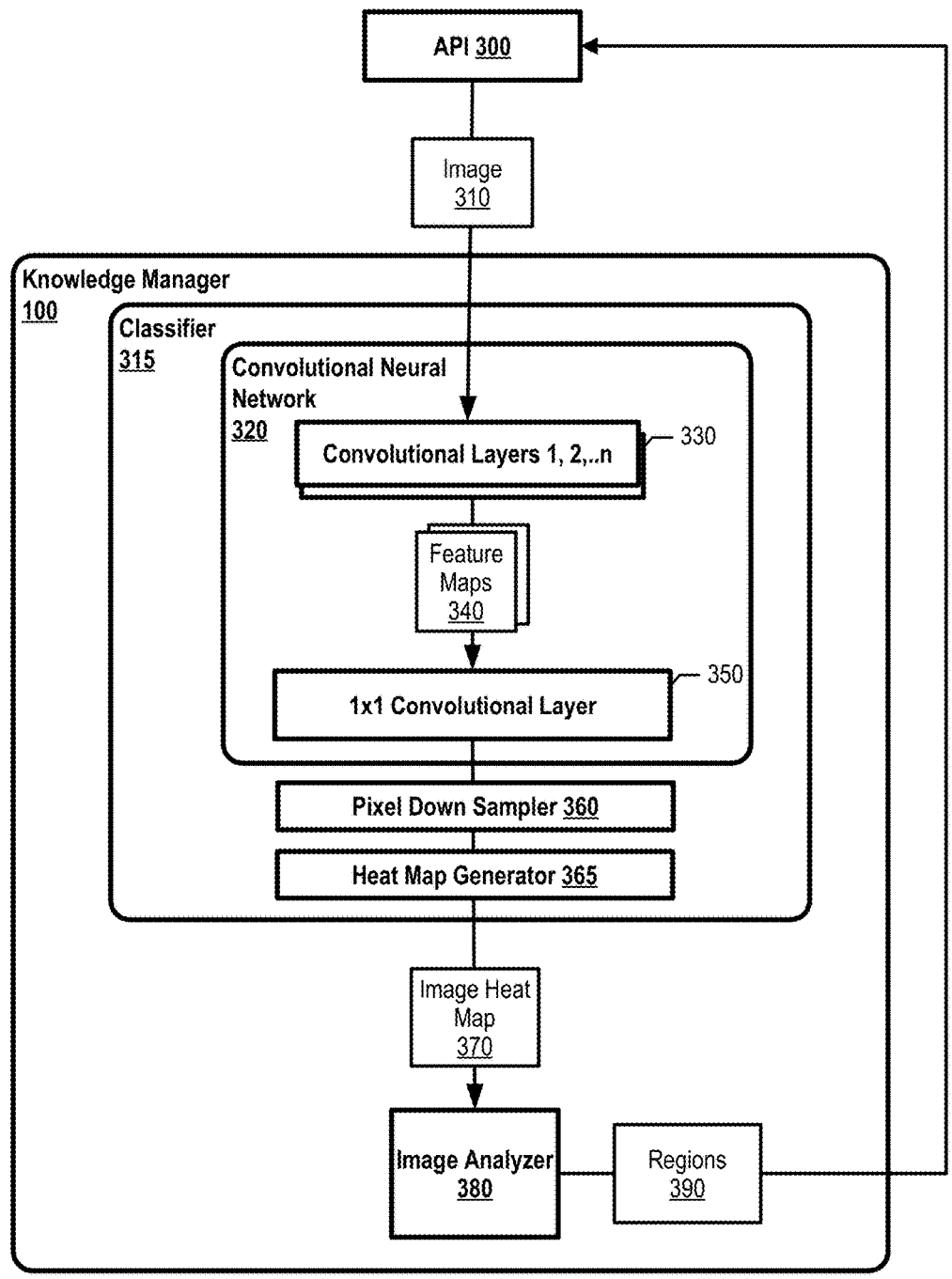
FIG. 3 depicts an example of a knowledge manager receiving an image and using a convolutional neural network to detect location regions of various objects within the image.

FIG. 3 depicts an example of a knowledge manager receiving an image and using a convolutional neural network to detect location regions of various objects within the image. Knowledge manager 100 begins by training classifier 310's convolutional neural network 320 using a set of training images (see FIG. 5 and corresponding text for further details). Convolutional neural network 320 trains on a small set of training images because convolutional neural network 320 uses strictly convolutional layers to produce a pixel-level annotation and, when applied at various scales, the pixel-level annotation provides a substantial number of training samples because each pixel at each scale becomes a training sample.

After training convolutional neural network 320, knowledge manager 100 then receives image 310 from API 300 that may include, for example, three dogs, a cat, and two beach balls. Convolutional neural network 320 uses convolutional layers 330 to perform convolutional computations and generate feature maps 340. Next, 1×1 convolutional layer 350 reduces feature maps 340 down to single decision points on a per-pixel basis, referred to herein as per-pixel decision points. Classifier 310 uses the per-pixel decision points to determine whether a particular pixel belongs to a particular target class, such as a "dog" target class.

In one embodiment, classifier 315 uses pixel down sampler 360 to reduce the number of per-pixel decision points for which to evaluate. Pixel down sampler 360 down samples the per-pixel decision points, such as a 4× down sampling. Then for each pixel that is down sampled (e.g., 4×), heat map generator 365 makes a decision about whether or not the down sampled per-pixel decision points belongs to a particular target class. In turn, heat map generator 365 generates image heat map 370 that identifies, on a down sampled per-pixel basis, location regions in image 310 that includes objects corresponding to target classes (see FIG. 4 and corresponding text for further details).

Image analyzer 380 evaluates image heat map 370 and identifies location regions 390, which identify particular regions within image 310 corresponding to target objects. In turn, image analyzer 380 provides location regions 390 to API 300 (see FIG. 6 and corresponding text for further details). In one embodiment, API 300 provides regions 390 to a post-processing system, such as one that performs facial recognition, text extraction, etc.

Figure 4:
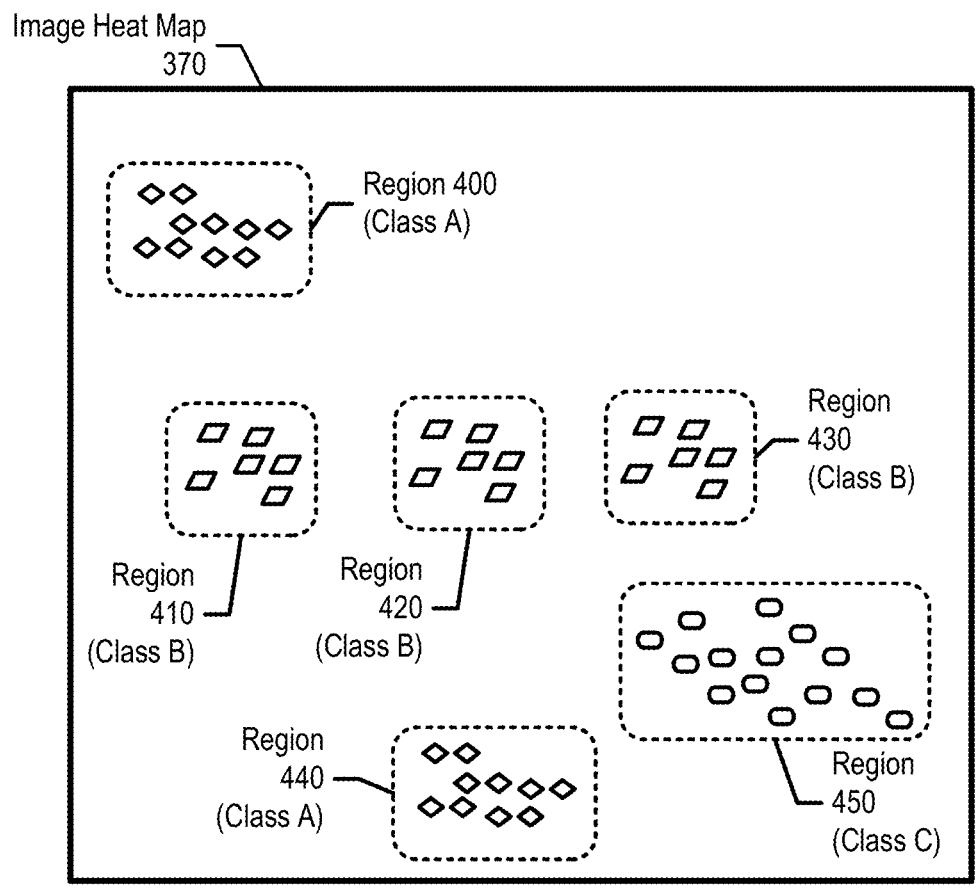
FIG. 4 is an exemplary diagram of a heat map generated by a knowledge manager that depicts different image classes in various location regions of an image.

FIG. 4 is an exemplary diagram of a heat map generated by a knowledge manager that depicts different image classes of different object types in various location regions of an image. Image heat map 370 corresponds to the example discussed earlier where image 310 includes three dogs, a cat, and two beach balls.

Location regions 400 and 440 have per-pixel decision points determined to be class A that, for example, correspond to a beach ball. Location regions 410, 420, and 430 have per-pixel decision points determined to be class B that, for example, is a dog class. And, location region 450 has per-pixel decision points determined to be class C that, for example, is a cat class. As can be seen, knowledge manager 100 is able to identify multiple objects in different location regions due to the per-pixel resolution of image heat map 370.

Figure 5:
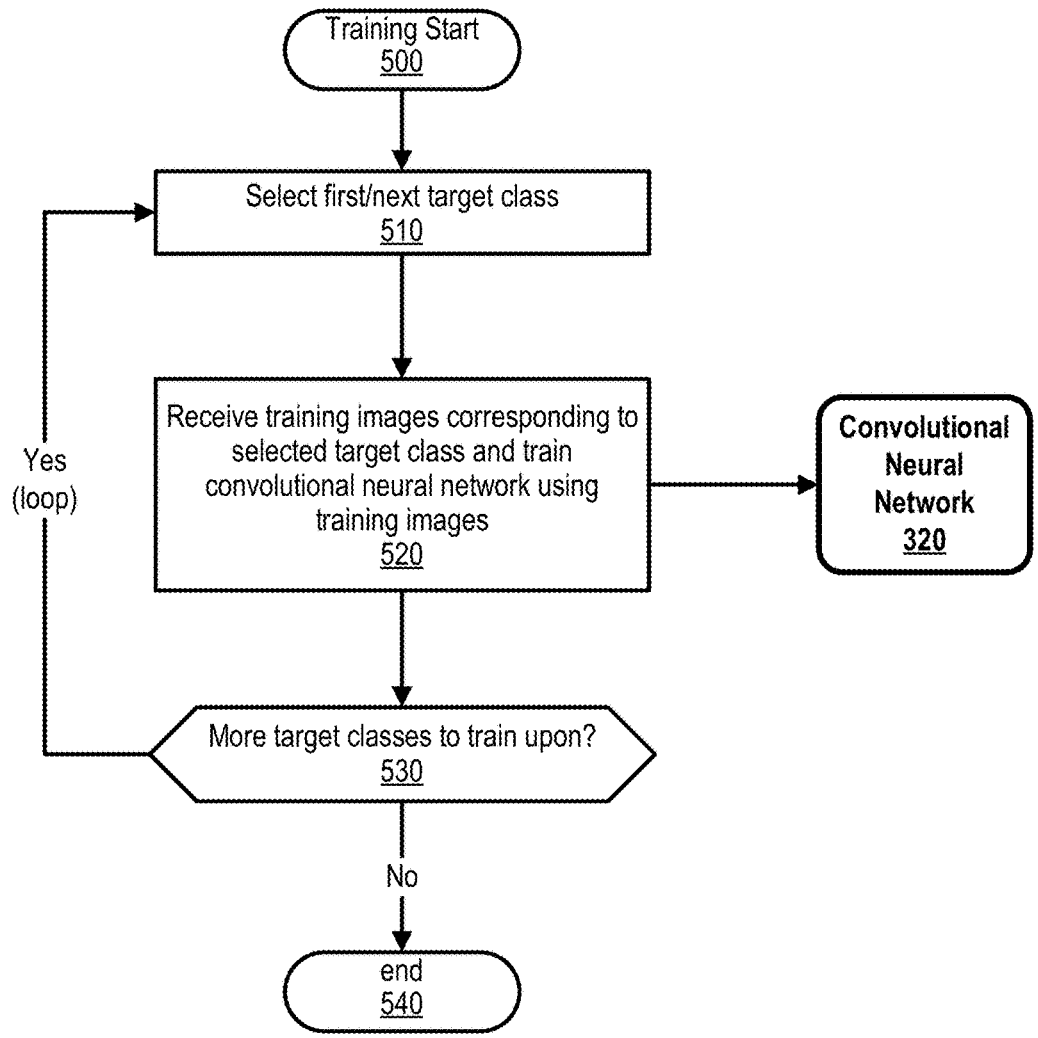
FIG. 5 is a flowchart showing steps taken to train a classifier's convolutional neural network that is subsequently utilized to generate a heat map for input images.

FIG. 5 is a flowchart showing steps taken to train a classifier's convolutional neural network that is subsequently utilized to generate a heat map for input images. Training processing commences at 500 whereupon, at step 510, the process selects a first target class on which to train. At step 520, the process receives training images corresponding to the target class and trains convolutional neural network 320 using the training images. As discussed earlier, convolutional neural network 320 does not require a substantial amount of images to train to a target class because it uses strictly convolutional layers to produce a pixel-level annotation. Applied at various scales, this approach provides a substantial number of training samples since each pixel at each scale becomes a training sample.

A determination is made as to whether there are more target classes on which to train convolutional neural network 320 (decision 530). If there are more target classes on which to train, decision 530 branches to the "Yes" branch, which loops back to select a different target class and train convolutional neural network 320 using a corresponding set of training images. This looping continues until there are no more target classes on which to train convolutional neural network 320, at which point decision 530 branches to the "No" branch, whereupon training processing ends at 540.

In one embodiment, processing may receive annotated data for which to train upon due to the small amount of training data required by convolutional neural network 320. In another embodiment, processing may train convolutional neural network 320 using different size images because convolutional neural network 320 is purely convolutional and operates on multiple size images.

Figure 6:
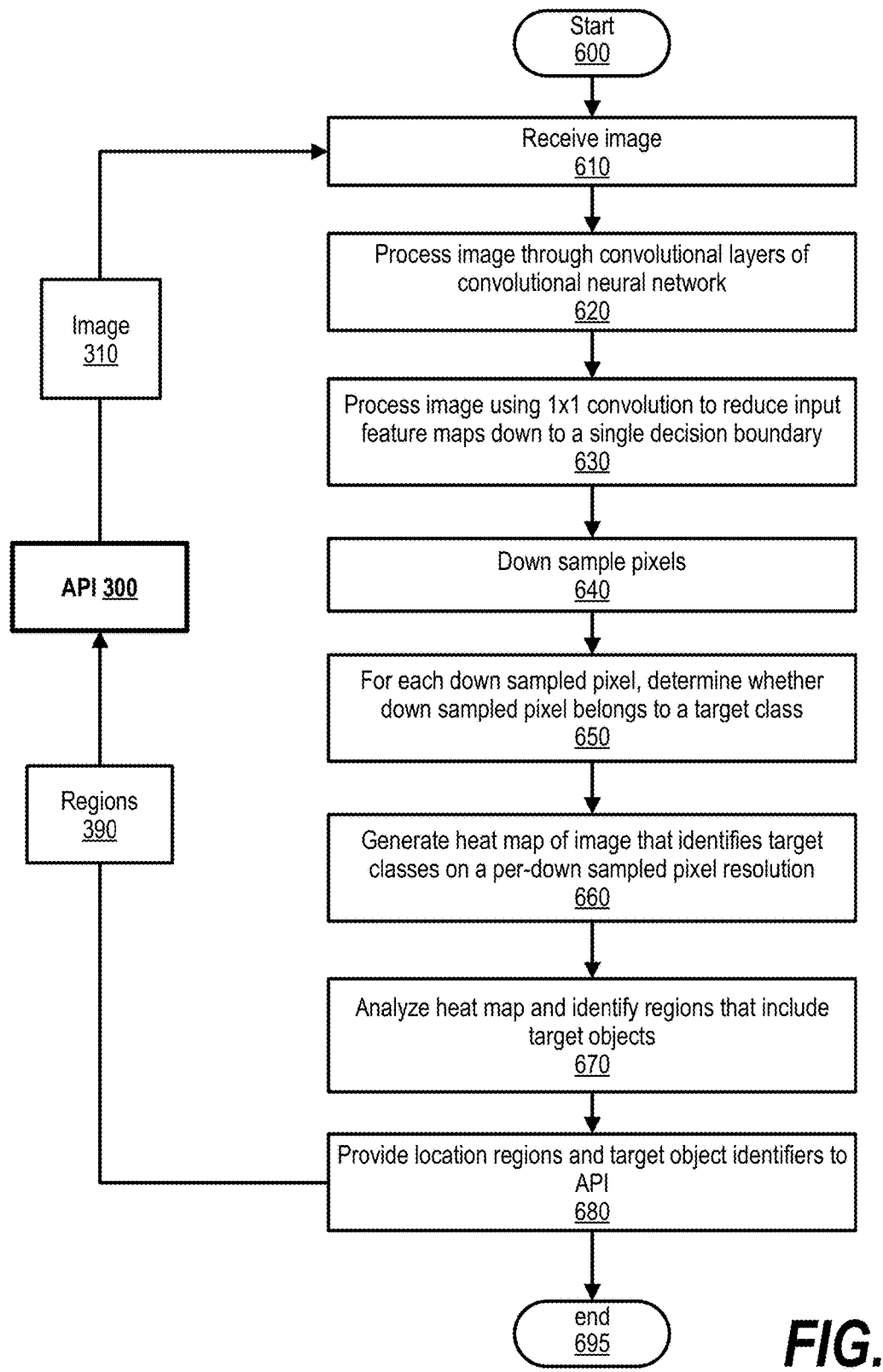
FIG. 6 is a flowchart showing steps taken by a knowledge manager to generate a heat map of an image using a convolutional neural network and identifying location regions of objects within the image based upon the heat map.

FIG. 6 is a flowchart showing steps taken by a knowledge manager to generate a heat map of an image using a convolutional neural network and identifying location regions of objects within the image based upon the heat map. Processing commences at 600 whereupon, at step 610, the process receives image 310 via API 300. At step 620, the process processes the image through convolutional layers of convolutional neural network 320 to generate feature maps 340. At step 630, the process performs a 1×1 convolution to reduce the feature maps down to per-pixel decision points.

At step 640, the process down samples the results of the 1×1 convolution, such as by using a 4× down sampling. In one embodiment, the process may choose not perform step 640 to maintain resolution on a per-pixel basis. At step 650, for each down sampled per-pixel decision point, the process determines whether the down sampled per-pixel decision point belongs to a target class (e.g., a dog class, a cat class, etc.). At step 660, the process generates a heat map of the image using the down sampled per-pixel decision points (see FIG. 4 and corresponding text for further details). At step 670, the process analyzes the heat map and identifies location regions corresponding to target objects. At step 680, the process provides the identified location regions and target object identifiers 390 to API 300. FIG. 6 processing thereafter ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    generating a pixel-level heat map of an image using a convolutional neural network that comprises a plurality of convolutional layers and at least one 1×1 fully-connected convolutional layer, wherein the pixel-level heat map includes a plurality of per-pixel decision points corresponding to a plurality of pixels in the image;
    detecting one or more sets of the plurality of per-pixel decision points that correspond to one or more target objects; and
    marking one or more regions of the heat map that correspond to the detected one or more sets of per-pixel decision points, wherein each of the one or more regions indicate a location of the one or more target objects.

2. The method of claim 1 further comprising:
    processing the image using the plurality of convolutional layers, resulting in a set of feature maps; and
    processing the set of feature maps by the 1×1 fully-connected convolutional layer, resulting in the plurality of per-pixel decision points.

3. The method of claim 2 further comprising:
    determining, for at least a selected one of the per-pixel decision points, whether the selected per-pixel decision point corresponds to a target class corresponding to at least one of the one or more target objects; and
    assigning the target class to the selected per-pixel decision point based upon the determination.

4. The method of claim 3 wherein the plurality of per-pixel decision points are down sampled, and wherein the determining, the assigning, and the detecting are performed on the down sampled plurality of per-pixel decision points.

5. The method of claim 1 wherein, prior to the generating of the pixel-level heat map, the method further comprises:
training the convolutional neural network using a set of training images, wherein the training further comprises:
creating, by the plurality of convolutional layers, a plurality of pixel-level annotations from the set of training images; and
training on the plurality of pixel-level annotations at a plurality of scales.

6. The method of claim 1 wherein the detecting further comprises:
identifying a first one of the one or more regions corresponding to a first one of the one or more target objects; and
identifying a second one of the one or more regions corresponding to a second one of the one or more target objects.

7. The method of claim 6 wherein the first target object is a different object type than the second target object.

8. An information handling system comprising:
one or more processors;
a memory coupled to at least one of the processors; and
a set of computer program instructions stored in the memory and executed by at least one of the processors in order to perform actions of:
generating a pixel-level heat map of an image using a convolutional neural network that comprises a plurality of convolutional layers and at least one 1×1 fully-connected convolutional layer, wherein the pixel-level heat map includes a plurality of per-pixel decision points corresponding to a plurality of pixels in the image;
detecting one or more sets of the plurality of per-pixel decision points that correspond to one or more target objects; and
marking one or more regions of the heat map that correspond to the detected one or more sets of per-pixel decision points, wherein each of the one or more regions indicate a location of the one or more target objects.

9. The information handling system of claim 8 wherein at least one of the one or more processors perform additional actions comprising:
processing the image using the plurality of convolutional layers, resulting in a set of feature maps; and
processing the set of feature maps by the 1×1 fully-connected convolutional layer, resulting in the plurality of per-pixel decision points.

10. The information handling system of claim 9 wherein at least one of the one or more processors perform additional actions comprising:
determining, for at least a selected one of the per-pixel decision points, whether the selected per-pixel decision point corresponds to a target class corresponding to at least one of the one or more target objects; and
assigning the target class to the selected per-pixel decision point based upon the determination.

11. The information handling system of claim 10 wherein the plurality of per-pixel decision points are down sampled, and wherein the determining, the assigning, and the detecting are performed on the down sampled plurality of per-pixel decision points.

12. The information handling system of claim 8 wherein, prior to the generating of the pixel-level heat map, at least one of the one or more processors perform additional actions comprising:
training the convolutional neural network using a set of training images, wherein the training further comprises:
creating, by the plurality of convolutional layers, a plurality of pixel-level annotations from the set of training images; and
training on the plurality of pixel-level annotations at a plurality of scales.

13. The information handling system of claim 8 wherein at least one of the one or more processors perform additional actions comprising:
identifying a first one of the one or more regions corresponding to a first one of the one or more target objects; and
identifying a second one of the one or more regions corresponding to a second one of the one or more target objects.

14. The information handling system of claim 6 wherein the first target object is a different object type than the second target object.

15. A computer program product stored in a computer readable storage medium, comprising computer program code that, when executed by an information handling system, causes the information handling system to perform actions comprising:
generating a pixel-level heat map of an image using a convolutional neural network that comprises a plurality of convolutional layers and at least one 1×1 fully-connected convolutional layer, wherein the pixel-level heat map includes a plurality of per-pixel decision points corresponding to a plurality of pixels in the image;
detecting one or more sets of the plurality of per-pixel decision points that correspond to one or more target objects; and
marking one or more regions of the heat map that correspond to the detected one or more sets of per-pixel decision points, wherein each of the one or more regions indicate a location of the one or more target objects.

16. The computer program product of claim 15 wherein the information handling system performs additional actions comprising:
processing the image using the plurality of convolutional layers, resulting in a set of feature maps; and
processing the set of feature maps by the 1×1 fully-connected convolutional layer, resulting in the plurality of per-pixel decision points.

17. The computer program product of claim 16 wherein the information handling system performs additional actions comprising:
determining, for at least a selected one of the per-pixel decision points, whether the selected per-pixel decision point corresponds to a target class corresponding to at least one of the one or more target objects; and
assigning the target class to the selected per-pixel decision point based upon the determination.

18. The computer program product of claim 17 wherein the plurality of per-pixel decision points are down sampled, and wherein the determining, the assigning, and the detecting are performed on the down sampled plurality of per-pixel decision points.

19. The computer program product of claim 15 wherein, prior to the generating of the pixel-level heat map, the information handling system performs additional actions comprising:
training the convolutional neural network using a set of training images, wherein the training further comprises:

creating, by the plurality of convolutional layers, a plurality of pixel-level annotations from the set of training images; and training on the plurality of pixel-level annotations at a plurality of scales.

20. The computer program product of claim 15 wherein the information handling system performs additional actions comprising:

identifying a first one of the one or more regions corresponding to a first one of the one or more target objects; and identifying a second one of the one or more regions corresponding to a second one of the one or more target objects.

* * * * *